United States Patent
Wu et al.

(10) Patent No.: US 7,117,577 B2
(45) Date of Patent: Oct. 10, 2006

(54) METHOD OF FASTENING MOLD SHELL WITH MOLD SEAT WITHOUT RISK OF CAUSING MOLD SHELL TO CRACK

(75) Inventors: Jen-Chin Wu, Tao-Yuan (TW); Chia-Hua Chang, Tao-Yuan (TW); Ming-Jen Wang, Tao-Yuan (TW)

(73) Assignee: Chung-Shan Institute of Science & Technology, Tao-Yuan ( * ) Notice: Subject to any disclaimer, the term of this patent is extended or adjusted under 35 U.S.C. 154(b) by 434 days.

(21) Appl. No.: 10/671,542

(22) Filed: Sep. 29, 2003

(65) Prior Publication Data
US 2005/0066510 A1    Mar. 31, 2005

(51) Int. Cl.
*B23P 25/00* (2006.01)
*C25D 1/00* (2006.01)

(52) U.S. Cl. ............ 29/458; 29/527.2; 29/525.13; 205/70; 427/456

(58) Field of Classification Search ............ 29/458, 29/527.2, 525.13; 205/70, 192, 191, 67; 427/449, 456
See application file for complete search history.

(56) References Cited

U.S. PATENT DOCUMENTS

| 3,424,657 | A | * | 1/1969 | Fialkoff | ............ 205/73 |
| 4,740,276 | A | * | 4/1988 | Marmo et al. | ............ 205/71 |
| 6,376,015 | B1 | * | 4/2002 | Rickerby | ............ 427/250 |

* cited by examiner

*Primary Examiner*—Marc Jimenez
(74) *Attorney, Agent, or Firm*—Bacon & Thomas PLLC

(57) ABSTRACT

A method is designed to fasten a mold shell with a mold seat without causing the mold shell to crack. The method involves a first step in which a metal shell is formed on a model by electrocasting. The metal shell is then provided with at least one nut therewith by soldering through electrocasting. The metal shell is separated from the model and is then provided with a metal layer of a thickness by arc spraying, with the metal layer circumventing the nut. The mold seat is provided with at least one through hole. The mold shell is fastened with the mold seat by a bolt which is engaged with the nut via the through hole of the mold seat.

9 Claims, 3 Drawing Sheets

METHOD OF FASTENING MOLD SHELL WITH MOLD SEAT WITHOUT RISK OF CAUSING MOLD SHELL TO CRACK

FIELD OF THE INVENTION

The present invention relates generally to a method of fastening a mold shell with a mold seat, and more particularly to a method of fastening a mold shell with a mold seat by means of one or more screws.

BACKGROUND OF THE INVENTION

The conventional electrocasted mold comprises a mold shell which is formed of a metal material in conjunction with a model. Upon completion of a process in which the mold shell is separated from the model, the mold shell is subjected to a mechanical finishing or dressing. The electrocasting process takes place at a slow pace. For example, the deposition rate of the electrocasting metal ranges from 0.06 to 0.5 mm/hr. In light of such a slow rate of deposition of the electrocasting metal, an electrocasting process may take weeks or even months to complete. As a result, the thickening process of the mold shell is carried out by arc spraying. However, such a thickened mold shell is prone to crack under a stress in the course of drilling.

SUMMARY OF THE INVENTION

The primary objective of the present invention is to provide a novel method of fastening a mold shell with a mold seat without the risk of causing the mold shell to crack.

In keeping with the principle of the present invention, the foregoing objective of the present invention is attained by a method of fastening a mold shell with a mold seat, which comprises the following steps of:

(a) forming a metal shell on a model by electrocasting;

(b) providing the metal shell with one or more columnar bodies adhered thereto;

(c) thickening the metal shell by electrocasting so as to embed the base of each of the columnar bodies in the thickened metal shell;

(d) separating the metal shell from the model;

(e) providing the metal shell with a metal layer of a thickness by arc spraying; and (f) joining the metal shell with a mold seat in such a manner that one or more through holes of the mold seat are aligned with the columnar bodies.

Preferably, the columnar bodies of the step (b) are provided with a threaded hole. More preferably, the step (f) involves the use of one or more bolts whereby the bolts are engaged with the threaded holes of the columnar bodies via the through holes of the mold seat.

Alternatively, the method of the present invention further comprises forming a threaded hole in each of the columnar bodies after the step (b) and before the step (f). Preferably, the metal shell and the metal seat are fastened together in the step (f) by one or more bolts which are engaged with the threaded holes of the columnar bodies via the through holes of the mold seat.

Preferably, each of the columnar bodies of the step (b) is a threaded rod. More preferably, the method further comprises a step ($d_1$) after the step (d), with the step ($d_1$) involving the use of a nut to engage the threaded rod whereby the nut is greater in height than the threaded rod. In this case, the metal shell is fastened with the mold seat by one or more bolts which are respectively engaged with the nuts via the through holes of the mold seat.

Preferably, the method of the present inventon further comprises a step ($e_1$) after the step (d), with the step ($e_1$) involving forming an interface metal layer on the metal shell by arc spraying whereby the interface metal layer is used to enhance the bonding of the metal shell and the metal layer referred to in the step (e).

A mold structure constructed according to a first embodiment of the present invention comprises:

an electrocasted metal shell;

a columnar body with a threaded hole whereby said columnar body is fastened with said metal shell by soldering through electrocasting;

a metal layer of a thickness whereby said metal layer is formed on said metal shell in such a manner that said metal layer circumvents said columnar body;

a mold seat provided with a threaded through hole; and a bolt engaged with said threaded hole of said columnar body and said threaded through hole of said mold seat.

A mold structure constructed according to a second embodiment of the present invention comprises:

an electrocasted metal shell;

a threaded rod fastened with the metal shell by soldering through electrocasting;

a columnar body with a threaded hole whereby said columnar body is engaged with said threaded rod and is greater in height than said threaded rod;

a metal layer of a thickness whereby said metal layer is formed on said metal shell such that said metal layer circumvents said columnar body;

a mold seat provided with a through hole; and a bolt engaged with said threaded hold of said columnar body via said through hole of said mold seat.

Preferably, said mold structure further comprising an interface layer which is formed between the metal shell and the metal layer.

The features and the advantages of the present invention will be more readily understood upon a thoughtful deliberation of the following detailed description of the preferred embodiments of the present invention with reference to the accompanying drawings.

DETAILED DESCRIPTION OF THE PREFERRED EMBODIMENTS

Figure 1:
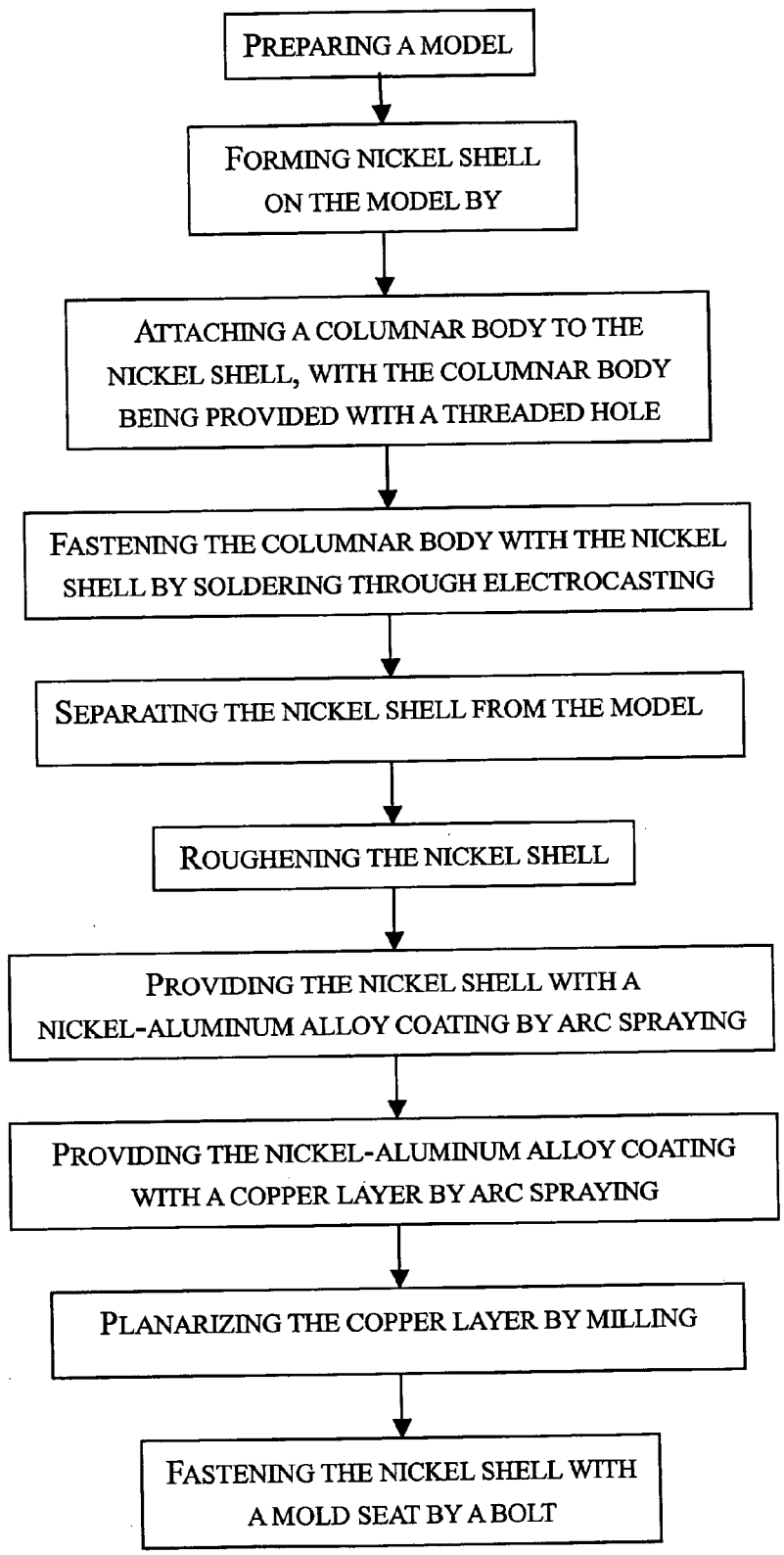
FIG. 1 shows a process flow chart of a first preferred embodiment of the present invention.
Figure 2:
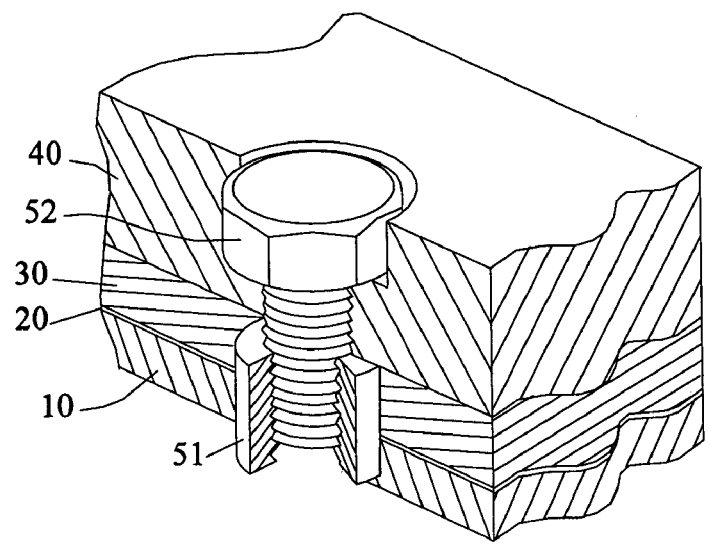
FIG. 2 shows a partial sectional view of an electrocasted mold of the first preferred embodiment of the present invention.

As shown in FIGS. 1 and 2, a method embodied in the present invention is intended to fasten a mold shell of a model with a mold seat 40.

The method involves a first step in which a nickel shell 10 is formed on a model by electrocasting. The nickel shell 10 has a thickness ranging from 3 to 5 mm. The model is made of a destructible material with a low melting point, such as alloy casting, aluminum casting, or zinc casting. The model may be also made of an indestructible stainless steel, which can be used repeatedly. The nickel shell 10 is then provided with a columnar body 51 attached thereto by a silver paste adhesive. The columnar body 51 has a threaded hole. The columnar body 51 is securely fastened with the nickel shell 10 by soldering through electrocasting in the electrocasting bath such that the base of the columnar body 51 is embedded in the nickel shell 10. Upon completion of a process in which the nickel shell 10 is separated from the model, an outer surface of the nickel shell 10 is roughened by sand blasting. In order to thicken the nickel shell 10, the nickel shell 10 is provided with a nickel-aluminum alloy layer 20 by arc spraying for the purpose of enhancing the bonding of the nickel shell 10 and a copper layer. The copper layer is deposited on the alloy layer 20 by arc spraying, thereby resulting in formation of a thick copper layer 30, which is planarized by milling. The mold shell 20 is fastened with the mold seat 40 by a bolt 52 which is engaged with the threaded hole of the columnar body 51.

In a second preferred embodiment of the present invention, the columnar body 51 may be modified in such a way that the columnar body 51 is a solid body, and a threaded hole is formed before or after the formation of the thick copper layer 30.

Figure 4:
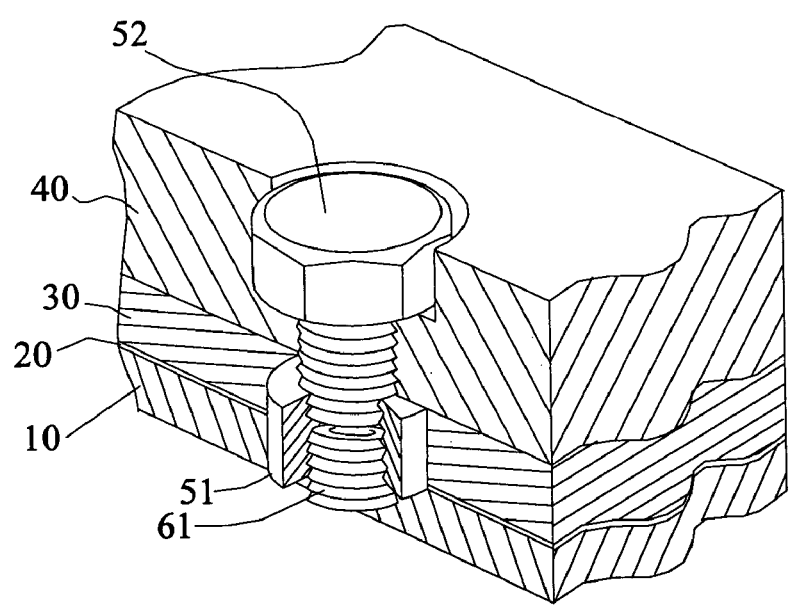
FIG. 4 shows a partial sectional view of an electrocasted mold of the second preferred embodiment of the present invention.
Figure 3:
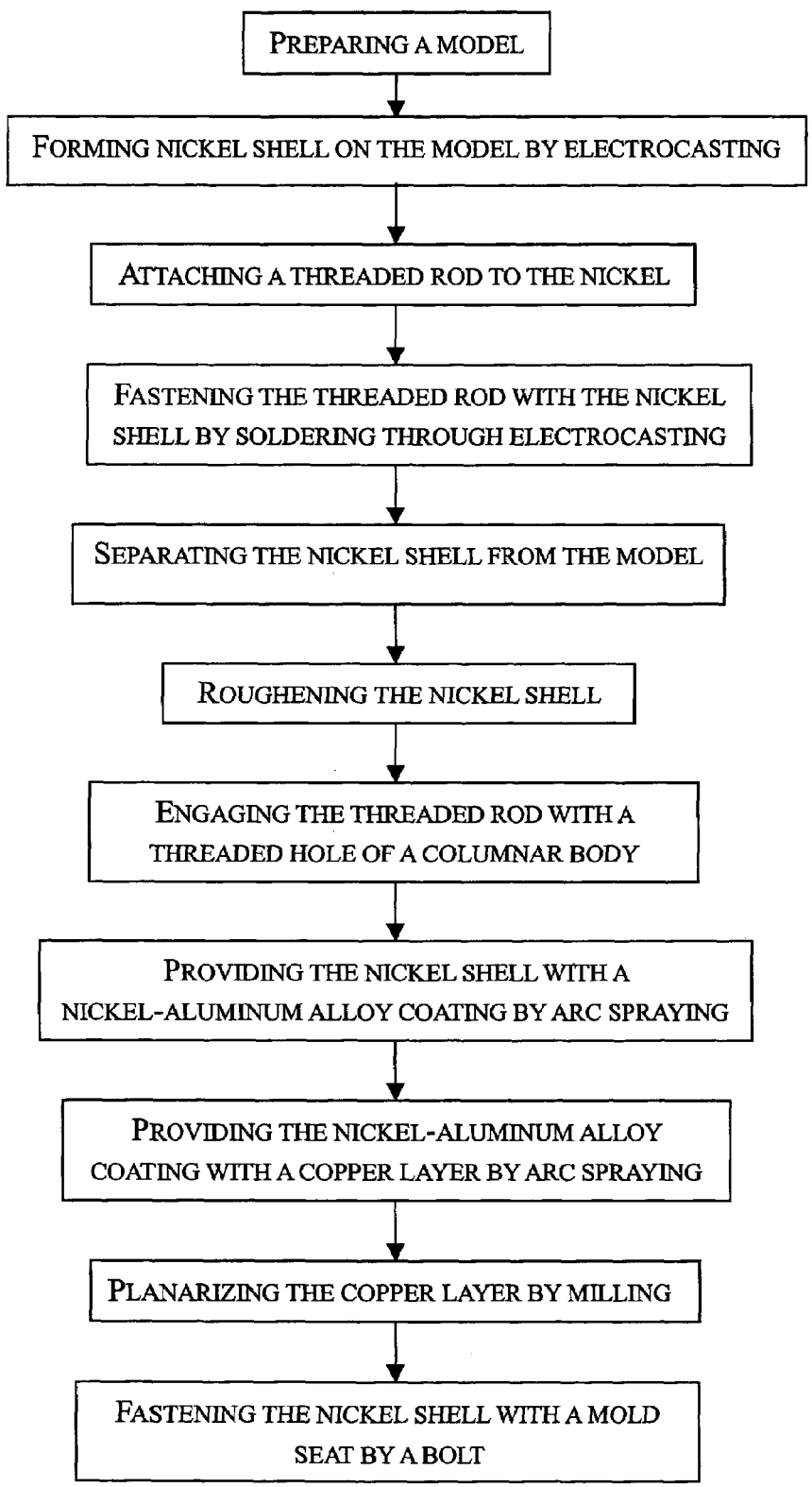
FIG. 3 shows a process flow chart of a second preferred embodiment of the present invention.

As shown in FIGS. 3 and 4, the third preferred embodiment of the present invention is basically similar to the first preferred embodiment described above with reference to FIGS. 1 and 2, with the difference being that the former comprises a threaded rod 61 which is adhered to the nickel shell 10 upon formation of the nickel shell 10 in the electrocasting bath. The nickel shell 10 is thickened by electrocasting so as to embed the base of the threaded rod 61 in the nickel shell 10. The threaded rod 61 is then engaged with the threaded hole of the columnar body or a nut 51. Thereafter, an alloy layer 20 and a copper layer 30 are formed. Finally, the mold shell is fastened with a mold seat 40 by a bolt 52 which is engaged with the threaded hole of the columnar body 51.

The experimental results show that the methods of the present invention are capable of overcoming the crack problem which is apt to transpire at the time when the mold shell is fastened with the mold seat by the conventional methods. The advantage of the present invention is attributable to the fact that the columnar body 51 or the threaded rod 61 is fastened with the nickel shell 10 by soldering in the electrocasting bath before the nickel shell 10 is thickened. As a result, the rejection rate of the mold production can be substantially reduced by employing the methods of the present invention.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A method of fastening a mold shell with a mold seat, said method comprising the following steps of:
    (a) forming a metal shell on a model by electrocasting;
    (b) providing the metal shell with one or more columnar bodies adhered thereto;
    (c) thickening the metal shell by electrocasting so as to embed the base of each of the columnar bodies in the thickened metal shell;
    (d) separating the metal shell from the model;
    (e) providing the metal shell with a metal layer of a thickness by arc spraying; and
    (f) joining the metal shell with a mold seat in such a manner that one or more through holes of the mold seat are aligned with the columnar bodies.

2. The method as defined in claim 1, wherein the columnar bodies of the step (b) are provided with a threaded hole.

3. The method as defined in claim 2, wherein the step (f) involves the use of one or more bolts whereby the bolts are engaged with the threaded holes of the columnar bodies via the through holes of the mold seat.

4. The method as defined in claim 1 further comprising forming a threaded hole in each of the columnar bodies after the step (b) and before the step (f).

5. The method as defined in claim 4, wherein the metal shell and the metal seat are fastened together in the step (f) by one or more bolts which are engaged with the threaded holes of the columnar bodies via the through holes of the mold seat.

6. The method as defined in claim 1, wherein each of the columnar bodies of the step (b) is a threaded rod.

7. The method as defined in claim 6 further comprising a step ($d_1$) after the step (d), with the step ($d_1$) involving the use of a nut to engage the threaded rod whereby the nut is greater in height than the threaded rod.

8. The method as defined in claim 7, wherein the metal shell is fastened with the mold seat by one or more bolts which are respectively engaged with the nuts via the through holes of the mold seat.

9. The method as defined in claim 1 further comprising a step ($e_1$) after the step (d), with the step ($e_1$) involving forming an interface metal layer on the metal shell by arc spraying whereby the interface metal layer is used to enhance the bonding of the metal shell and the metal layer referred to in the step (e).

* * * * *